United States Patent
Tassin et al.

(10) Patent No.: US 10,083,775 B2
(45) Date of Patent: Sep. 25, 2018

(54) CONDUCTIVE COMPOSITE MATERIAL AND METHOD FOR PRODUCING SAID CONDUCTIVE COMPOSITE MATERIAL

(71) Applicants: Centre National de la Recherche Scientifique, Paris (FR); Université du Maine, Le Mans (FR)

(72) Inventors: Jean-François Tassin, Change (FR); Radouane Sellak, Le Mans (FR); Frédérick Niepceron, Veigne (FR); Lazhar Benyahia, Le Mans (FR)

(73) Assignees: CENTRE NATIONAL DE LA RECHERCHE SCIENTIFIQUE-(CNRS), Paris (FR); UNIVERSITE DU MAINE, Le Mans (FR)

( * ) Notice: Subject to any disclaimer, the term of this patent is extended or adjusted under 35 U.S.C. 154(b) by 303 days.

(21) Appl. No.: 14/765,047

(22) PCT Filed: Jan. 30, 2014

(86) PCT No.: PCT/EP2014/051821
§ 371 (c)(1),
(2) Date: Nov. 16, 2015

(87) PCT Pub. No.: WO2014/118287
PCT Pub. Date: Aug. 7, 2014

(65) Prior Publication Data
US 2016/0064114 A1   Mar. 3, 2016

(30) Foreign Application Priority Data
Jan. 31, 2013 (FR) .................................... 13 50849

(51) Int. Cl.
*H01B 1/24* (2006.01)
*C08J 3/00* (2006.01)
(Continued)

(52) U.S. Cl.
CPC ................ *H01B 1/24* (2013.01); *C08J 3/005* (2013.01); *C08J 3/226* (2013.01); *C08J 5/24* (2013.01);
(Continued)

(58) Field of Classification Search
CPC .... H01B 1/24; H01B 1/22; C08J 3/005; C08J 3/226; C08J 5/24; C08J 2300/24;
(Continued)

(56) References Cited

U.S. PATENT DOCUMENTS 4,581,158 A   4/1986   Lin
6,197,898 B1   3/2001   Van Den Berg et al.
(Continued)

FOREIGN PATENT DOCUMENTS

WO   99/41304 A1   8/1999

OTHER PUBLICATIONS

Shi et al. "Selective Distribution of Carbon Black in Epoxy Resin/Thermoplastic Multiphase Composite". Advanced Materials Research vols. 652-654 (2013). Available Jan. 2013. Total pp. 4.*
(Continued)

*Primary Examiner* — Harold Pyon
*Assistant Examiner* — Danny N Kang
(74) *Attorney, Agent, or Firm* — Osha Liang LLP (57) ABSTRACT

The invention relates to a conductive material comprising a first phase including a thermoset compound, a second phase, consisting of a smaller volume, including a thermoplastic compound, and a conductive compound, wherein the second phase is dispersed in the first phase, the two phases are bicontinuous, and the conductive compound is situated at the interface between the first and second phases.

14 Claims, 8 Drawing Sheets

(51) Int. Cl.
*C08J 3/22* (2006.01)
*C08J 5/24* (2006.01)
*C08L 63/00* (2006.01)
*H01B 1/22* (2006.01)
*C08K 3/04* (2006.01)
*C08L 25/06* (2006.01)

(52) U.S. Cl.
CPC ............... *C08K 3/04* (2013.01); *C08L 25/06* (2013.01); *C08L 63/00* (2013.01); *H01B 1/22* (2013.01); *C08J 2300/24* (2013.01); *C08J 2363/00* (2013.01); *C08J 2400/22* (2013.01); *C08J 2425/06* (2013.01); *C08K 2201/001* (2013.01)

(58) Field of Classification Search
CPC ............... C08J 2363/00; C08J 2400/22; C08J 2425/06; C08L 63/00; C08K 2201/001
USPC .................................................. 252/500, 511
See application file for complete search history.

(56) References Cited

U.S. PATENT DOCUMENTS 6,331,586 B1 * 12/2001 Thielen .................. C08L 23/06
524/401

2002/0004556 A1 * 1/2002 Foulger .................. C08L 23/06
525/70
2011/0163275 A1 * 7/2011 Simmons ........... C08G 59/5033
252/511

OTHER PUBLICATIONS

International Search Report issued in PCT/EP2014/051821 dated Apr. 22, 2014 (4 pages).
Written Opinion of the International Searching Authority issued in PCT/EP2014/051821 dated Apr. 22, 2014 (8 pages).
Database WPI, Week 201271, Thomson Scientific, London, GB; AN 2012-M67645, XP002710420 (2 pages).
Database WPI, Week 201154, Thomson Scientific, London, GB; AN 2011-H52618, XP002710421 (2 pages).
Shi, R. et al.; "Selective Distribution of Carbon Black in Epoxy Resin/Thermoplastic Multiphase Composites"; Advanced Materials Research, XP009171701, vols. 652-654, Dec. 22-23, 2012, pp. 73-76 (4 pages).
Ma, C. et al.; "Carbon Black Selective Dispersion and Electrical Properties of Epoxy Resin/Polystyrene/Carbon Black Ternary Composites", Advanced Materials Research, XP009171700, vol. 548, May 5-6, 2012, pp. 94-98 (5 pages).

* cited by examiner

FIG. 15

# CONDUCTIVE COMPOSITE MATERIAL AND METHOD FOR PRODUCING SAID CONDUCTIVE COMPOSITE MATERIAL

CROSS-REFERENCE TO RELATED APPLICATIONS

This application is a national stage application of PCT/EP2014/051821 filed on Jan. 30, 2014, which claims priority to French Priority Application No. 1350849 filed on Jan. 31, 2013, the entire contents of which are hereby incorporated by reference.

FIELD OF THE INVENTION

The present disclosure relates to composite materials and to the method for manufacturing them, and especially concerns composite materials comprising a conductive compound.

DESCRIPTION OF THE RELATED ART

Polymer materials are nowadays used for many applications and in many fields, such as the transport sector, but also electronics or packaging. However, polymer materials are naturally insulating and removal of the electrical charges on these materials poses a problem.

It is known practice, for example in the aeronautical field, to deposit on the surface of polymer materials a material which is itself conductive, for example a metallic material. However, this solution has the drawback of a large increase in weight of the assembly, and thus an increase in energy consumption, which runs precisely counter to the desired lightening by means of polymer materials.

Another solution consists in using polymers that are intrinsically conductive. However, they are difficult to implement and expensive, which restricts their application in mass-channel materials.

A different solution is to create a network of functional particles within the polymer material. Carbon black has been known for a long time to give the material into which it is incorporated antistatic properties or even electrical conductivity properties once the carbon black particles are present in sufficient amount to achieve percolation. WO 99/41304 discloses mixtures of thermoplastics (and thus noncrosslinked systems) formulated with conductive fillers located either in a phase or at the interface of two thermoplastic phases.

U.S. Pat. No. 4,581,158 also discloses, for example, a conductive thermosetting dispersion composition comprising a mixture of particles of a polymer material that is swellable at its plasticization temperature, at least one liquid reactive plasticizer for the swellable polymer materials, and particles of an electrically conductive and heat-conducting material. This composition is heated for a time sufficient to plasticize it and cure it to obtain a conductive thermoset material. By heating to the curing temperature, the polymer particles are swollen by plasticization or solvation by the reactive plasticizer. When the polymer particles containing the reactive plasticizer swell to their maximum volume, a conductive network of conductive particles is formed. The conductive network of conductive particles and the size of the swollen polymer particles become permanent after polymerization or crosslinking of the reactive plasticizer.

However, the materials containing a network of conductive fillers proposed in the prior art contain a large fraction of such particles, generally in a concentration of greater than 40% by mass of the material, and thus have poor mechanical properties and are uneconomical. Furthermore, their presence leads to a large increase in viscosity, which limits their field of use.

For example, in the specific case of obtaining by infusion a composite functional material based on polymer material, this solution must be excluded since such an addition of conductive particles leads to an increase in the viscosity of the polymer material, which becomes too high to be compatible with infusion of the polymer material on a reinforcement.

The aim of the present disclosure is to propose a conductive material that has good electrical conductivity and antistatic properties while at the same time containing only a low concentration of conductive compound so as optionally to allow the infusion of a fibrous screen for producing reinforced and conductive composites.

SUMMARY

One object of the present disclosure is to provide materials of the type based on a thermoset compound, a thermoplastic compound and a conductive compound for removing electrical charges. In this perspective, the Applicant has advantageously found that a material having two co-continuous phases, wherein the conductive compound forms a percolating network wherein the conductive charges are located at the interfaces between the two phases, makes it possible to satisfy this aim with a low content of conductive fillers.

In the present description and in the claims that follow, the terms "thermosetting compound" are used in reference to a compound that can become solid by chemical reaction under the action of heat. In the case of a polymer compound, this solidification may be performed by polymerization and/or crosslinking of the polymer.

In the present description and in the claims that follow, the terms "thermoset compound" are used in reference to a thermosetting compound which has undergone a heat treatment that has led to its solidification.

In the present description and in the claims that follow, the terms "thermoplastic compound" are used in reference to a compound which softens under the effect of heat and hardens on cooling, in a reversible manner.

In the present description and in the claims that follow, the terms "percolating network" are used in reference to a network formed by conductive particles arranged such that they can percolate and allow electron transport.

According to a first aspect of the present disclosure, said object is filled with a conductive material comprising a first phase including a thermoset compound, a second phase, which is smaller in volume, including a thermoplastic compound, and a conductive compound, wherein the second phase is dispersed in the first phase, the two phases are bicontinuous, and the conductive compound is located at the interface between the first and second phases.

In the present description and in the claims that follow, the terms "bicontinuous phases" or "co-continuous phases" are used in reference to a mixture of two separate phases, each having a continuity, creating two systems interpenetrated in each other.

In a preferred embodiment, the first and second phases are continuous.

In a preferred embodiment, the conductive compound forms a percolating network at the interface between the first and second phases.

Advantageously, the creation of a percolating network of the conductive compound makes it possible to obtain a conductive material with good electrical conductivity and antistatic properties while at the same time containing a small concentration of conductive compound.

The thermoset compound comprises any suitable material known to those skilled in the art. In a preferred embodiment, the thermoset compound comprises a thermoset resin. In a preferred embodiment, the thermoset resin comprises the product of reaction of a mixture of a resin and a hardener.

The resin may comprise any system having an increase in its molar mass during the curing, involving or not involving crosslinking. In a preferred embodiment, the resin comprises at least one from among an epoxy resin, a polyester resin (acid/polyol), a polyurethane resin (polyol/diisocyanate), a phenol-formaldehyde resin, or a urea-formaldehyde resin. The epoxy resin is preferably based on BADGE (bisphenol A diglycidyl ether), based on para-aminophenol or a Novolac epoxy resin.

In a preferred embodiment, the hardener comprises at least one hardener of amine type, an acid anhydride, a Lewis acid, a phenol and any type of photochemical-crosslinking agent. In a preferred embodiment, the hardener of amine type comprises at least one from among MCDEA (4,4'-methylenebis 3-chloro-2,6-diethylaniline), a DDM (diamino-diphenylmethane), a DDS (diaminodiphenylsulfone) and any type of amine derivative.

In a preferred embodiment, the epoxy resin comprises an epoxy/amine system, such as a resin based on BADGE (bisphenol A diglycidyl ether) and on an MCDEA (4,4'-methylenebis 3-chloro-2,6-diethylaniline) hardener.

In a preferred embodiment, the epoxy resin/hardener mixture is selected from the group of precursor couples consisting of the epoxy/amine couple, the epoxy/acid couple, the epoxy/anhydride couple, the epoxy/phenol couple and a mixture of these compounds.

In a preferred embodiment, the material comprises from 50% to 97% by mass of thermoset resin.

The form of the conductive compound may be any suitable form known to those skilled in the art. In a preferred embodiment, the conductive compound is in at least one of the following forms: individualized or aggregated particles of various forms; spheres or the like (three main dimensions of the same order of magnitude), platelets (two large dimensions relative to the third), nanowires or nanotubes (one large dimension relative to the other two). In a preferred embodiment, the conductive compound is in the form of spherical particles or the like.

The conductive compound is of any suitable size and known to those skilled in the art. In a preferred embodiment, the conductive compound has a mean size of between 5 nm and 5 µm, preferably between 5 and 1000 nm and preferably between 5 and 200 nm.

The conductive compound comprises any suitable material known to those skilled in the art. In a preferred embodiment, the conductive compound comprises at least one from among carbon, carbon black, single-walled, double-walled or multi-walled carbon nanotubes, optionally linked together, graphite, graphene, oxides generally in the form of powders or rods, such as antimony tin oxide, indium tin oxide, or zinc oxide, silicon carbide, metal powders based on aluminum or a transition metal, such as copper, silver, molybdenum, nickel or gold, an intrinsically conductive polymer such as polyaniline, poly(3,4-ethylenedioxythiophene) or polypyrrole. In a preferred embodiment, the conductive compound comprises carbon black. In another preferred embodiment, the conductive compound consists of transition metal particles.

The conductive material comprises any suitable concentration of conductive compound that is known to those skilled in the art for obtaining a percolating network of said conductive compound. The concentration of conductive material depends on the compound selected, its form and its size.

In a preferred embodiment, the conductive material comprises less than 15% by mass of conductive compound, preferably less than 5% by mass of conductive compound. In a preferred embodiment, the conductive material comprises from 0.1 to 5% by mass of conductive compound and preferably from 1 to 5% by mass of conductive compound. In the present description and in the claims that follow, the mass concentrations of the compounds are expressed relative to the total mass of the thermoplastic, thermosetting and conductive compounds.

The thermoplastic compound comprises any suitable material known to those skilled in the art. In a preferred embodiment, the thermoplastic compound comprises at least one polymer. In a preferred embodiment, the thermoplastic compound comprises at least one from among polystyrene (PS), impact polystyrene (HIPS), polystyrene-polybutadiene block copolymer (PS-block-PBu), poly(ether-imide), poly(ether-ether-ketone), polycarbonate, polysulfone, and a thermoplastic polymer belonging to the styrene family, to the acrylate or methacrylate family such as poly(methyl methacrylate), to the polyester family such as polycaprolactone or polyethylene terephthalate, or to the vinyl family such as polyethylene, or copolymers thereof. In a preferred embodiment, the thermoplastic compound comprises polystyrene.

In a preferred embodiment, the thermoplastic compound comprises at least one polymer with a molar mass of between 1000 and 500 000 g·mol$^{-1}$ and preferably between 100 000 and 200 000 g·mol$^{-1}$.

In a preferred embodiment, the thermoplastic compound is soluble in the thermosetting compound. A temperature increase, during the mixing of the thermoplastic compound in the thermosetting compound, may facilitate this dissolution. The thermoplastic compound and the thermosetting compound are selected so as to form a homogeneous and clear solution above the upper critical solution temperature (UCST) or below the lower critical solution temperature (LCST). These temperatures vary according to the system selected. As known to those skilled in the art, the dissolution of the thermoplastic compound in the thermosetting compound may prove to be difficult or even impossible if the thermoplastic compound has a high degree of crystallinity.

The conductive material comprises any suitable concentration of thermoplastic compound known to those skilled in the art. In a preferred embodiment, the conductive material comprises from 5% to 30% by mass of thermoplastic compound and preferably from 12% to 13% by mass of thermoplastic compound.

In a preferred embodiment, the first phase of the conductive material may comprise at least one additive, such as an additive for improving the properties of the material. In a preferred embodiment, the additive for improving the properties of the material comprises at least one inorganic salt. In a preferred embodiment, the inorganic salt is a copper salt. In a preferred embodiment, the inorganic salt is at least one from among $CuBr_2$ and $CuCl_2$.

The conductive material comprises any suitable concentration of additive known to those skilled in the art. In a preferred embodiment, the conductive material comprises from 0.1 to 500 µmol·g⁻¹, preferably from 10 to 100 µmol·g⁻¹, and preferably from 10 to 30 µmol·g⁻¹ of the total mass of the conductive material.

Advantageously the conductive material according to the present disclosure contains a low concentration of conductive compound while at the same time having good electrical conductivity and antistatic characteristics.

In a preferred embodiment, the material according to the present disclosure has an electrical conductivity of between $10^{-10}$ and $10^2$ S·cm⁻¹, preferably between $10^{-8}$ and $10^2$ S·cm⁻¹ and preferably between $10^{-6}$ and $10^{-1}$ S·cm⁻¹.

In a preferred embodiment, the conductive compound is initially present in at least one from among the first and second phases. In a preferred embodiment, each of the first and second phases comprises less than 50% by mass of conductive compound, preferably less than 30% by mass of conductive compound.

In a preferred embodiment, the conductive material further comprises a reinforcement. In a preferred embodiment, the reinforcement is at least one from among a weave of fibers and a porous material. In a preferred embodiment, the reinforcement comprises a weave of fibers, the fibers comprising at least one from among carbon fibers, glass fibers and aramid fibers. In a preferred embodiment, the reinforcement comprises a weave of carbon fibers.

Another aspect of the present disclosure concerns a method for manufacturing a conductive material, comprising the following steps:
a) mixing a conductive compound and a thermoplastic compound in the molten state;
b) mixing the mixture obtained in step a) with a thermosetting compound; and
c) curing the thermosetting compound and separating the mixture obtained in step b) as a second phase including the thermoplastic compound dispersed in a first phase including the thermosetting compound, the phases being bicontinuous and the conductive compound being located at the interface of the first and second phases.

The method for manufacturing the conductive material according to the present disclosure comprises preferred steps that are performed so as to obtain a conductive material according to one or more preferred embodiments described above.

During the phase separation, the conductive compound, which is naturally attracted by the polar nature of the thermosetting compound, migrates from the phase including the thermoplastic compound to the phase including the thermosetting compound. Advantageously, the mixture of the thermoplastic compound and of the conductive compound, prior to mixing with the thermosetting compound, allows coating of the conductive compound with the thermoplastic compound. Thus, during its migration, the conductive compound becomes concentrated at the interface between the two phases, to which it gives stability and therefore does not pass into the phase including the thermosetting compound.

In step a), during its mixing with the conductive compound, the thermoplastic compound is in the molten state. The mixing in step a) is thus performed at a temperature above the melting point of the selected thermoplastic compound.

The mixing of the conductive compound and of a thermoplastic compound may be performed via any suitable method known to those skilled in the art. In a preferred embodiment, the mixing in step a) is performed in a mixer or an extruder by applying a shear for optimally dispersing the conductive particles. Advantageously, mixing the thermoplastic compound and the conductive compound under shear makes it possible to break the aggregates of conductive compound and thus to produce a homogeneous mixture.

According to a preferred embodiment, the mixing of the conductive compound and of the thermoplastic compound is performed in an extruder.

In a preferred embodiment, the mixing of the conductive compound and of the thermoplastic compound is performed at a shear rate of from 1 to 1000 s⁻¹, preferably from 10 to 1000 s⁻¹ and preferably from 300 to 700 s⁻¹.

In a preferred embodiment, the mixing in step b) is performed with stirring, preferably between 10 and 1000 rpm and preferably between 10 and 500 rpm.

In a preferred embodiment, step b) consists in dissolving the mixture prepared in step a) in the thermosetting compound. The mixing conditions must be selected as a function of the components used while at the same time avoiding starting the crosslinking reaction of the thermosetting compound during this step.

In a preferred embodiment, the mixing in step b) is performed at a temperature of between 70 and 200° C., preferably between 70 and 150° C. In a preferred embodiment, the dissolution of the compounds is facilitated by introducing a common solvent which is subsequently evaporated off.

In a preferred embodiment, step c) further comprises the addition of a hardener. In a preferred embodiment, the hardener is added after the total dissolution of the mixture prepared in step a) in the thermosetting compound.

The curing of the thermosetting compound and the phase separation are performed simultaneously via a reaction-induced phase separation.

The phase separation process may be explained in a simplified manner by a theoretical approach according to the Flory-Huggins model expressed by the following equation.

$$\frac{\Delta G}{RT} = \frac{\phi_{TD}}{Z_{TD}}\ln\phi_{TD} + \frac{\phi_{TP}}{Z_{TP}}\ln\phi_{TP} + \chi\phi_{TD}\phi_{TP}$$

wherein:
ΔG is the free enthalpy of the mixture;
R is the ideal gas constant;
T is the temperature;
$\phi_{TD}$ is the volume fraction of the thermosetting compound;
$\phi_{TP}$ is the volume fraction of the thermoplastic compound;
$\chi$ is the interaction parameter;
$Z_{TP}$ is the ratio of the molar volume of the thermoplastic compound to the molar volume of the fraction having the smallest molar volume of the thermoplastic compound;
$Z_{TD}$ is the ratio of the molar volume of the thermosetting compound to the molar volume of the fraction having the smallest molar volume of the thermosetting compound.

The mixture obtained in step b) is homogeneous. During the curing reaction, a phase separation is induced by the variation in the free enthalpy of the mixture (ΔG). Specifically, the Flory-Huggins equation shows that during curing, i.e. during the increase in molar mass of the thermosetting compound, the miscibility of the thermoplastic and thermosetting compounds decreases on account of the lowering in entropy of the mixture represented by the first two terms in the above equation. When the curing takes place at constant temperature, the conversion of the thermosetting system is measured for different compositions of thermoplastic. The phase diagram thus obtained has a minimum which corresponds to the critical concentration of thermoplastic phase for which the final morphology of the mixture is formed from two co-continuous phases.

Figure 1:
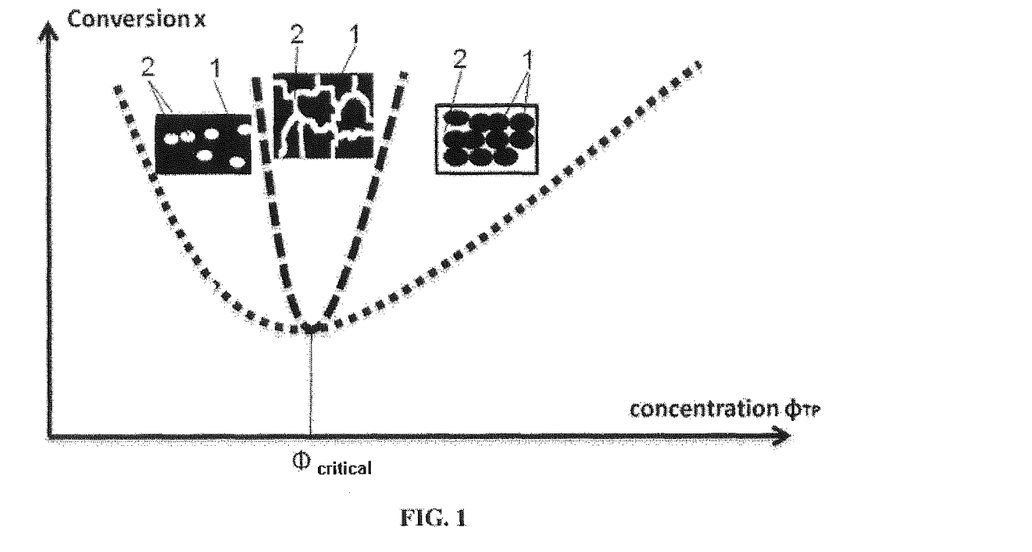
FIGS. 1 and 2 are graphs illustrating the phase diagram of a mixture.

FIG. 1 shows a phase diagram with the concentration of thermoplastic compound on the x-axis and the conversion x on the y-axis.

As illustrated in FIG. 1, immediately after the phase separation, two types of decomposition appear: a binodal decomposition illustrated by a dotted line and a spinodal decomposition illustrated by a dashed line. The morphologies formed by these two types of decomposition are very different: the phase separation by binodal decomposition leads to a phase in the form of spherical nodules 2 dispersed in another phase 1, whereas the phase separation by spinodal decomposition leads to a co-continuous structure of two phases 1, 2.

The critical concentration of thermoplastic compound ($\phi_{critical}$) represents the concentration of thermoplastic compound required to obtain two co-continuous phases, for a given temperature, a specific thermosetting compound and a specific thermoplastic compound.

It is possible, according to the experimental conditions, to obtain two co-continuous phases necessary for the electrical conduction property, without rigorously passing via the critical point. However, gellation of the thermosetting phase should not be reached.

Figure 2:
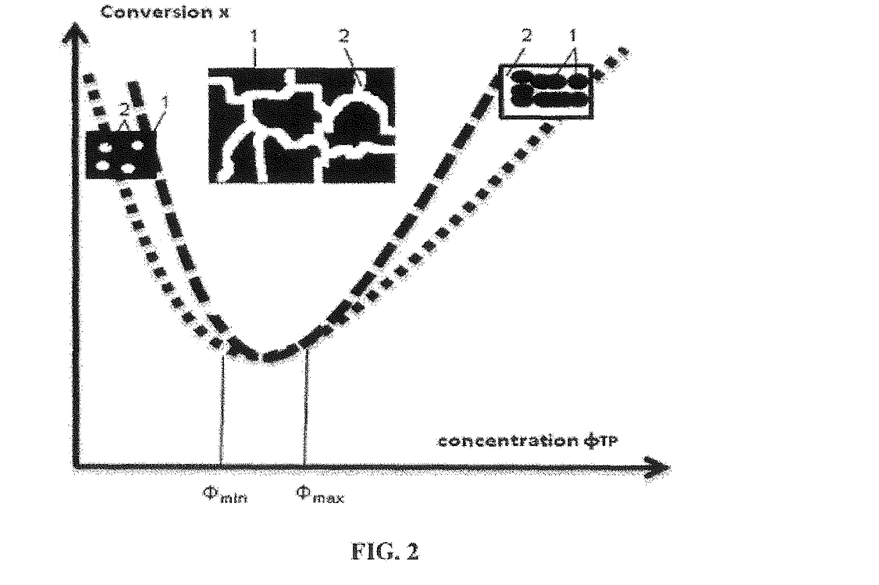

In practice, as illustrated in FIG. 2, the concentration of thermoplastic compound corresponds to a value range of ±5% by mass (absolute value) around the theoretical $\phi_{critical}$, preferably ±1% by mass (absolute value) in the range $\phi_{min} < \phi < \phi_{max}$. The critical concentration of thermoplastic compound depends, besides the chemical nature of the thermoplastic and of the thermosetting compound, on the molar mass of the thermoplastic.

Step c) is performed at a temperature that depends on the selected system. The temperature should allow the chemical reactions for forming the thermosetting network to take place and maintain a high viscosity of the thermoplastic phase. In a preferred embodiment, step c) is performed, preferably in a mold, at a temperature of between 50 and 500° C., preferably between 70 and 180° C., and preferably between 70 and 120° C.

The reaction time of step c) depends on the system under consideration and the temperature. In a preferred embodiment, step c) is performed for a duration of from 0.1 to 24 h, preferably from 0.1 to 15h, and preferably from 0.1 to 5 h. In a preferred embodiment, step c) is performed for a duration of from 5 to 10 hours.

In a preferred embodiment, the curing is performed by crosslinking or polymerization of the thermosetting material.

In a preferred embodiment, the method according to the present disclosure further comprises a step of infusion of the mixture obtained in step b) on a reinforcement. Step c) is then performed in the presence of the reinforcement.

BRIEF DESCRIPTION OF THE DRAWINGS

The present disclosure will now be described in reference to the attached drawings, in which the figures are not to scale and the dimensions of certain elements are enlarged for illustrative purposes, and in which FIGS. 4a and 4b illustrate a material according to the prior art.

DETAILED DESCRIPTION

Figure 3:
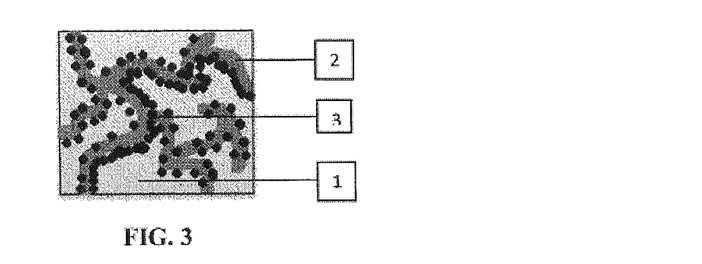
FIG. 3 is a schematic view in cross section of a conductive material according to the present disclosure.

FIG. 3 is a schematic view in cross section of a material according to the present disclosure. This material comprises a first phase 1 including a thermoset compound, a second phase 2 including a thermoplastic compound, and a conductive compound 3. The second phase 2 is dispersed in the first phase 1, the two phases 1 and 2 are bicontinuous, and the conductive compound 3 is located at the interface between the first and second phases 1 and 2.

EXAMPLES

Prior Art

Figure 4A:
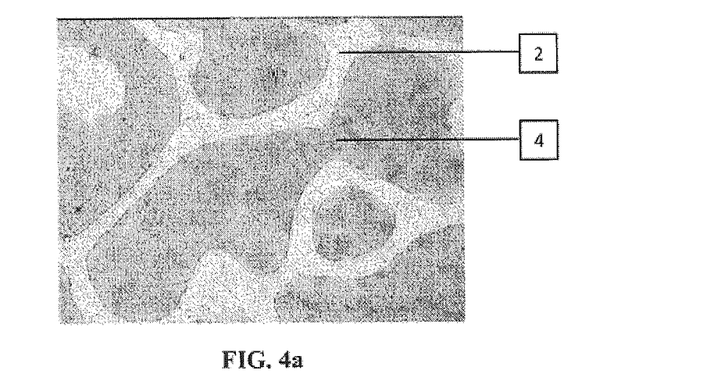
FIG. 4a is a view obtained with an optical microscope between slide and cover slip.
Figure 4B:
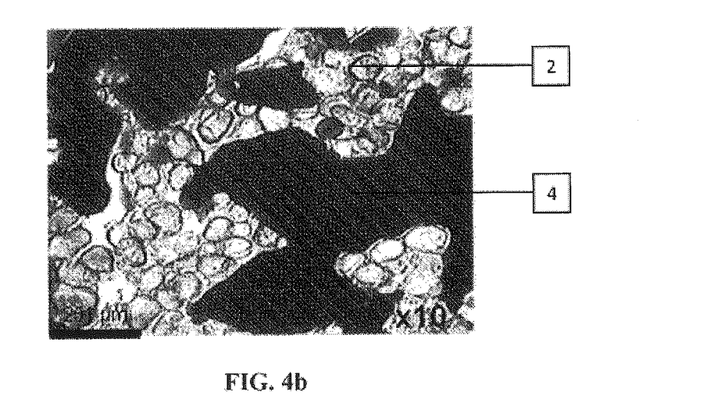
FIG. 4b is an optical microscope view of a cross section of a bulk sample.

FIGS. 4a and 4b illustrate a material according to the prior art. This material comprises a resin based on BADGE-MCDEA, 10% by mass of polystyrene and 2.5% by mass of carbon black. This material is not obtained by mixing the polystyrene and the carbon black in the molten state prior to mixing with the resin as envisaged by the present disclosure. This material was, on the other hand, obtained via a one-step mixing process. Specifically, the thermosetting phase, the thermoplastic phase and the carbon black were mixed at the same time. It may be seen in FIGS. 4a and 4b that the polystyrene and the resin have become separated into two co-continuous phases: a phase 2 comprising the polystyrene and a phase 4 comprising the resin. However, the carbon black is located in phase 4 including the resin and not at the interface between the two phases. There is thus no creation of a percolating network of the carbon black and, as illustrated in FIG. 5, the electrical conductivity of the material is very low.

Figure 5:
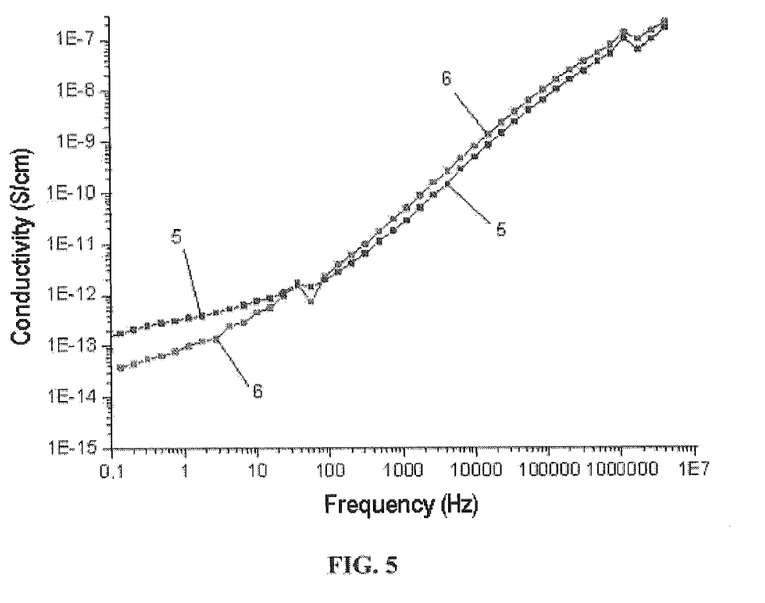
FIG. 5 is a graph representing the electrical conductivity of materials according to the prior art for two concentrations of conductive particles.

The electrical conductivity of the material of FIGS. 4a and 4b is illustrated in FIG. 5 by curve 5 and is of the order of $10^{14}$ S·cm$^{-1}$.

FIG. 5 also illustrates, via curve 6, the electrical conductivity of another material obtained via the same process as the material of FIGS. 4a and 4b, but comprising 5% by mass of carbon black. The conductivity of such a material is of the order of $10^{-13}$ S·cm$^{-1}$.

It is observed that the conductivity of the material according to the prior art is little affected by the carbon black content.

Invention

Ex.1/A first material was prepared with a BADGE-MCDEA epoxy resin considered under stoichiometric conditions (for example, 10 g of BADGE and 5.5 g of MCDEA), 12.5% by mass of polystyrene of molar mass 200 000 g·mol$^{-1}$ and 1.8% by mass of carbon black (Conductex 7055 Ultra, Columbian Chemicals, size 42 nm).

The carbon black and the polystyrene were mixed in the molten state for 10 minutes at a temperature of 200° C. and with a shear rate of 520 s$^{-1}$. Next, the mixture thus obtained was mixed with epoxy resin with stirring at a temperature of 80° C. Finally, the mixture was processed into a thin film and observed under an optical microscope at a temperature of 180° C.

Figure 6:
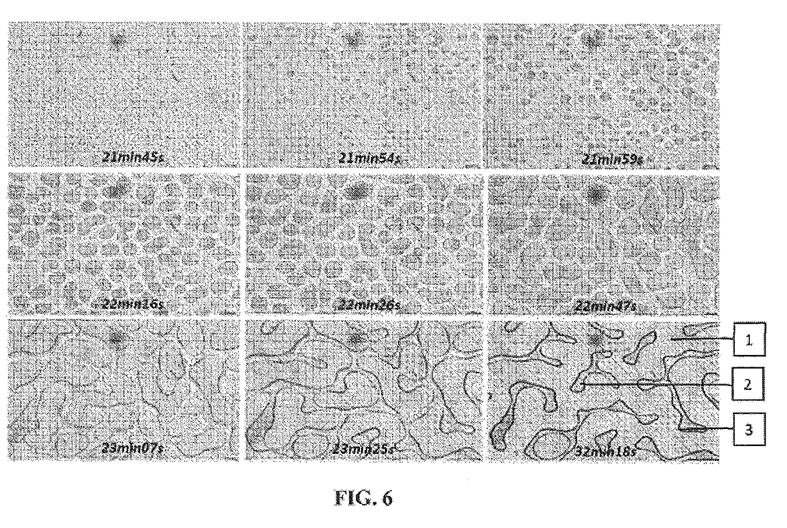
FIG. 6 illustrates the change in morphology, observed in thin film under an optical microscope, during the curing and the phase separation of a material according to the present disclosure.

FIG. 6 illustrates the change in morphology of the material during the heat treatment, by a succession of images obtained by light microscopy with a ×40 magnification. The formation of the two co-continuous phases 1, 2 is very clearly visible, as is the migration of the carbon black 3 from phase 2 including polystyrene to the interface between the two phases 1, 2.

Ex.2/Three other materials were prepared with a resin based on BADGE/MCDEA (in stoichiometric proportions), 12.5% by mass of polystyrene 200 000 g·mol$^{-1}$ and, 2.4%, 3.8% and 5.5% by mass of carbon black, respectively.

The carbon black and polystyrene were mixed in the molten state at a temperature of 200° C. and with a shear rate of 520 s$^{-1}$. Next, the mixture thus obtained was mixed with the BADGE/MCDEA with stirring at a temperature of 80° C. Finally, the whole was processed as a thin film and observed under an optical microscope at a temperature of 90° C. The same mixture was also introduced into a mold and processed at 90° C., leading to bulk samples on which slicing may be performed.

Figure 7A:
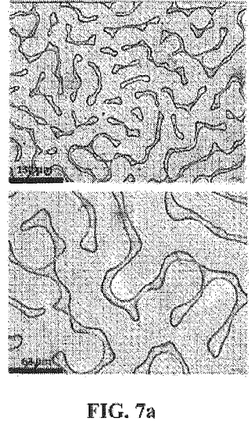
FIGS. 7a to 7c are views, observed in thin film under an optical microscope, of materials according to the present disclosure containing an increasing concentration of conductive particles.
Figure 7B:
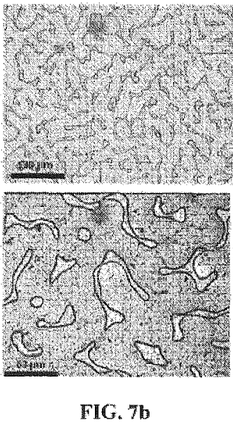
Figure 7C:
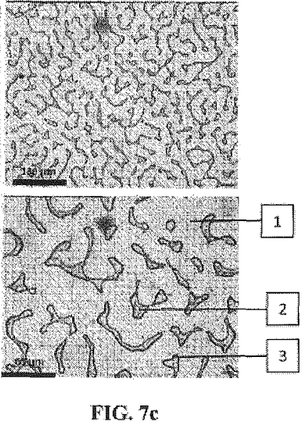

FIGS. 7a to 7c illustrate the location of the carbon black 3 at the interface between the two phases 1, 2 and also the decrease in size of the domains associated with the increase in the content of carbon black. FIG. 7a illustrates the material containing 2.4% by mass of carbon black, FIG. 7b illustrates the material containing 3.8% by mass of carbon black and FIG. 7c illustrates the material containing 5.5% by mass of carbon black.

Figure 8:
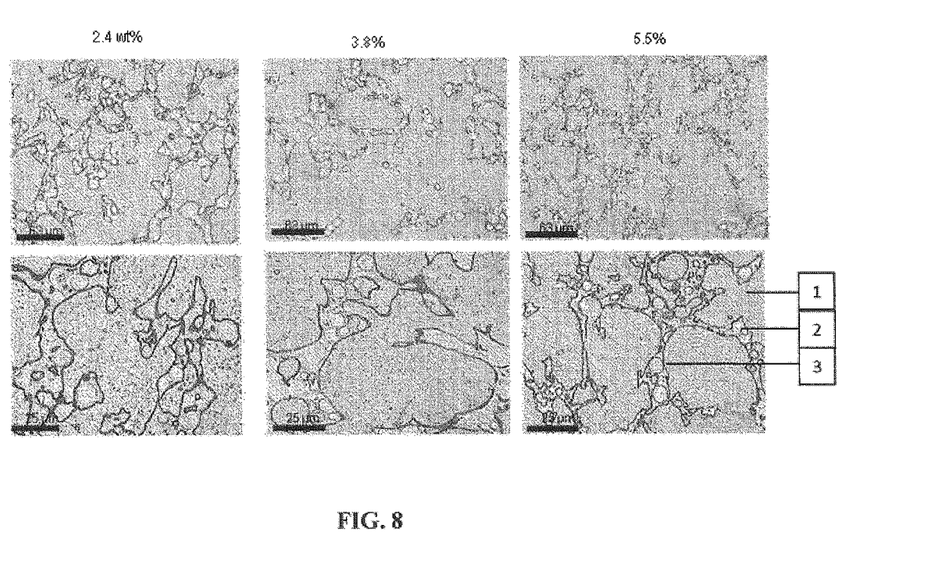
FIG. 8 illustrates slices of materials according to the present disclosure prepared in a mold, observed by light microscopy, containing an increasing concentration of conductive particles, FIG. 9 corresponds to a view in cross section of a material observed by light microscopy according to the present disclosure in the presence of a inorganic salt.

FIG. 8 illustrates the morphology observed by images obtained by light microscopy with two different magnifications for the materials obtained. The formation of the two co-continuous phases 1, 2 is very clearly visible. The carbon black 3 is clearly located at the interfaces of the thermoplastic/thermosetting system, but a fraction remains homogeneously dispersed in the thermoset phase 1.

Ex.3/A material was prepared with a BADGE-MCDEA epoxy resin, 13% by mass of polystyrene 200 000 g·mol$^{-1}$ with 5.4% by mass of carbon black of 40 nm in the presence of an additive, CuBr$_2$ with 0.05% by mass.

The carbon black and the polystyrene were mixed in the molten state at a temperature of 200° C. and with a shear rate of 520 s$^{-1}$. Next, the mixture thus obtained was mixed with the epoxy resin and the additive with stirring at a temperature of 80° C. Finally, the whole was processed in a mold at a temperature of 90° C.

Figure 9:
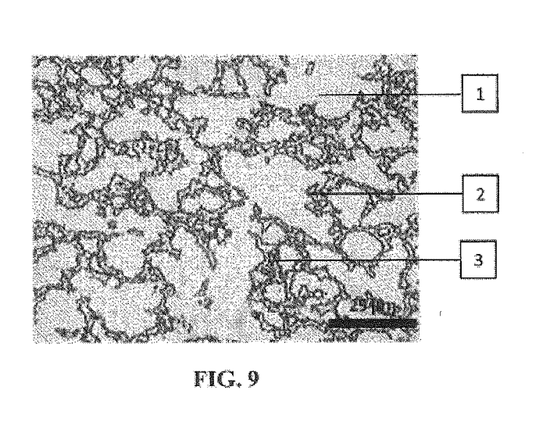

FIG. 9 illustrates the morphology of the material obtained, via an image obtained by light microscopy. The formation of the two co-continuous phases 1, 2 is very clearly visible, as is the migration of the carbon black 3 from the phase including polystyrene to the interface between the two phases 1, 2. It is also clearly visible that the thermoset phase 1 lacks carbon black, in contrast with the cases of the materials obtained in Example 2.

Figure 10:
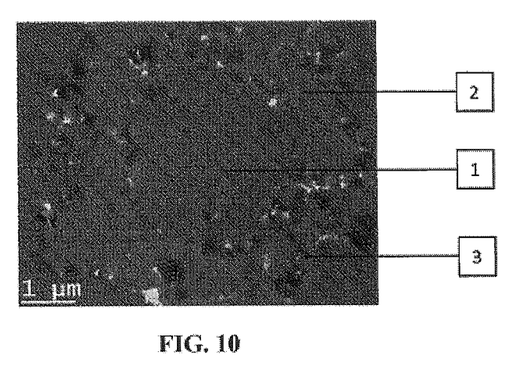
FIG. 10 is a micrograph obtained by transmission electron microscopy of the material of FIG. 9.

FIG. 10, representing a transmission electron microscopy image, makes it possible to appreciate that the fillers are located solely at the interfaces of the thermoplastic/thermosetting system.

Figure 11:
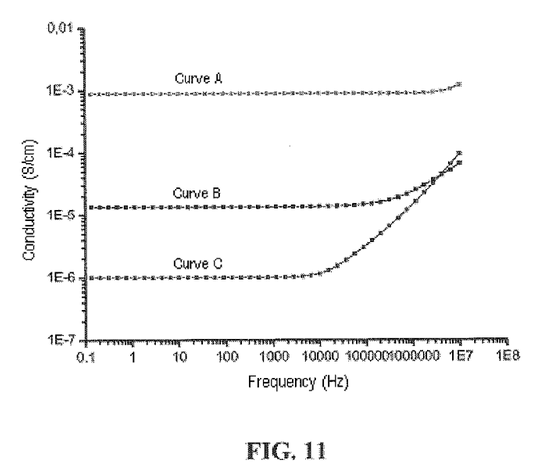
FIG. 11 illustrates the electrical conductivity of materials according to the present disclosure, FIG. 12 corresponds to a light microscopy image of a material according to the present disclosure, FIG. 13 corresponds to transmission electron microscopy images of the material of FIG. 12, FIG. 14 corresponds to light microscopy images of a material according to the present disclosure, and FIG. 15 corresponds to views in cross section of a material observed by light microscopy according to the present disclosure.

FIG. 11 (curve A), showing the dielectric characterization of the material produced according to Example 3, makes it possible to conclude that a conductive material may be obtained and that the electronic conductivity is 10$^{-6}$ S/cm.

Ex. 4/Another material was prepared with a resin based on BADGE/benzylamine (in stoichiometric proportions), containing 12.5% by mass of polystyrene 200 000 g·mol$^{-1}$ and a mass of carbon black of 4%.

The carbon black and the polystyrene were mixed in the molten state at a temperature of 200° C. and with a shear rate of 520 s$^{-1}$. Next, the mixture thus obtained was mixed with the BADGE/benzylamine with stirring at a temperature of 80° C. Finally, the whole was processed in a mold at a temperature of 90° C.

FIG. 11 (curve B), showing the dielectric characterization of the material produced according to Example 4, makes it possible to conclude that the electronic conductivity is of the order of 10$^{-5}$ S/cm.

Ex. 5/A material was prepared with a resin based on BADGE/MCDEA-benzylamine (in stoichiometric proportions with 75% MCDEA-25% benzylamine), including 13% by mass of polystyrene 200 000 g·mol$^{-1}$ and a mass of carbon black of 5.2%.

The carbon black and the polystyrene were mixed in the molten state at a temperature of 200° C. and with a shear rate of 520 s$^{-1}$. Next, the mixture thus obtained was mixed with the BADGE/MCDEA-benzylamine with stirring at a temperature of 80° C. Finally, the whole was processed in a mold at a temperature of 170° C.

FIG. 11 (curve C), showing the dielectric characterization of the material produced according to Example 5, makes it possible to conclude that the electronic conductivity is of the order of 10$^{-3}$ S/cm.

Ex. 6/A material was prepared with a BADGE-MCDEA epoxy resin, including 12.5% by mass of polystyrene 200 000 g·mol$^{-1}$ and a mass of silver nanoparticles, with a size of about 25 nm, of 1.3%.

The silver nanoparticles and the polystyrene were mixed in the molten state at a temperature of 200° C. and with a shear rate of 520 s$^{-1}$. Next, the mixture thus obtained was mixed with the BADGE-MCDEA epoxy resin with stirring at a temperature of 120° C. Finally, the whole was processed in a mold at a temperature of 90° C.

Figure 12:
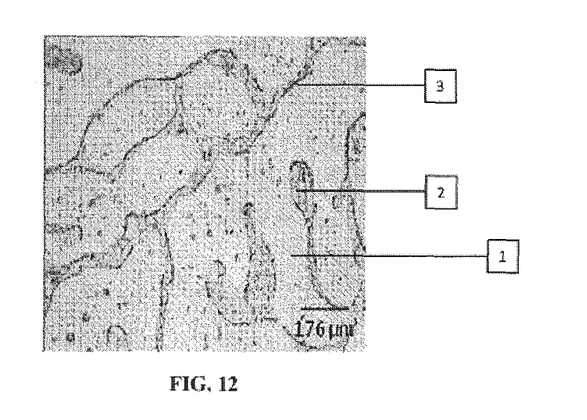
Figure 13:
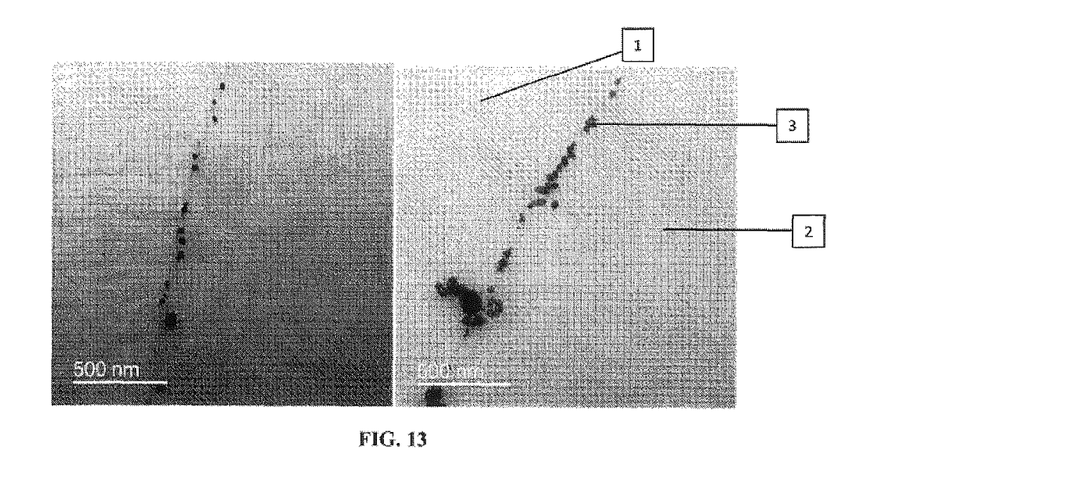

FIGS. 12 and 13, which are, respectively, a light microscopy image and transmission electron microscopy images, make it possible to appreciate that the fillers are located at the interfaces of the thermoplastic/thermosetting system.

Ex. 7/A material was prepared with a BADGE-MCDEA epoxy resin, including 12.5% by mass of polystyrene 200 000 g·mol$^{-1}$ and a mass of silicon carbide particles, with a diameter of about 20 nm, of 3%.

The silicon carbide and the polystyrene were mixed in the molten state at a temperature of 200° C. and with a shear rate of 520 s$^{-1}$. Next, the mixture thus obtained was mixed with the BADGE-MCDEA epoxy resin with stirring at a temperature of 120° C. Finally, the whole was processed in a mold at a temperature of 90° C.

Figure 14:
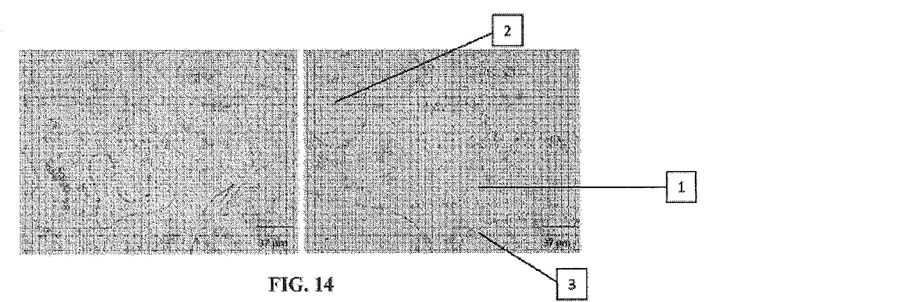

FIG. 14, showing light microscopy images, makes it possible to appreciate that the fillers are preferentially located at the interfaces of the thermoplastic/thermosetting system.

Ex. 8/A material was prepared with a BADGE-DDS epoxy resin, including 10% by mass of polycaprolactone 50 000 g·mol$^{-1}$ and a mass of carbon black of 1%.

The carbon black and the polycaprolactone were mixed in the molten state at a temperature of 200° C. and with a shear rate of 520 s$^{-1}$. Next, the mixture thus obtained was mixed with the BADGE-DDS epoxy resin with stirring at a temperature of 120° C. Finally, the whole was processed in a mold at a temperature of 170° C.

Figure 15:
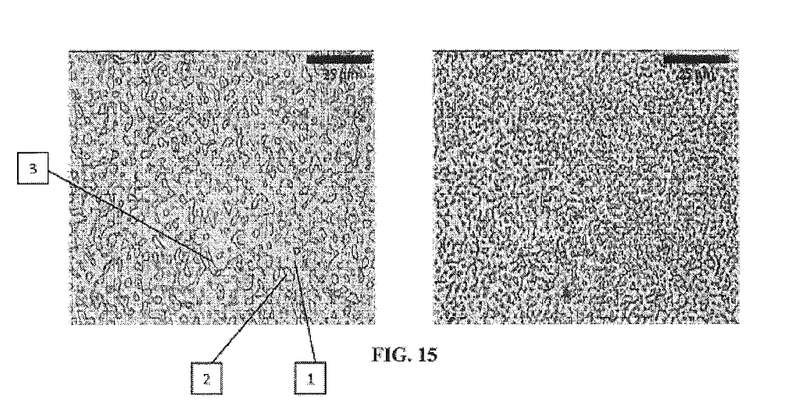

FIG. 15, which shows light microscopy images, makes it possible to appreciate that the fillers are preferentially located at the interfaces of the thermoplastic/thermosetting system.

The same phenomenon of preferential location of the fillers at the interfaces of the thermoplastic/thermosetting system was obtained for a material prepared under the same conditions, but containing a mass of carbon black of 2%.

The present disclosure thus described has, inter alia, the following advantages.

The conductive materials according to the present disclosure have good antistatic or electrical conductivity characteristics, while at the same time containing only a small concentration of conductive compound. These materials have many applications, especially on surfaces where removal of electrical charge is necessary, but also for isolating an environment from an electromagnetic radiation.

The present disclosure has been described in particular implementation examples illustrated by the various figures, which are not limiting. Additional embodiments may be envisaged by a person skilled in the art, for instance the choice of the thermoplastic, thermosetting and conductive compounds, and the concentrations thereof.

The invention claimed is:

1. A conductive material comprising:
a first phase including a thermoset compound;
a second phase, which is smaller in volume than the first phase, including a thermoplastic compound; and
a conductive compound,
wherein:
the second phase is dispersed in the first phase,
the two phases are bicontinuous, and
the conductive compound is located at the interface between the first and second phases
wherein the conductive material comprises from 5 to 30% by mass of the thermoplastic compound.

2. The conductive material as claimed in claim 1, wherein the thermoset compound comprises a thermoset resin.

3. The conductive material as claimed in claim 2, wherein the thermoset resin comprises the product of reaction of a mixture of an epoxy resin and a hardener.

4. The conductive material as claimed in claim 3, wherein the epoxy resin/hardener mixture is selected from the group of precursor couples consisting of an epoxy/amine couple, an epoxy/acid couple, an epoxy/anhydride couple, an epoxy/phenol couple, and combinations thereof.

5. The conductive material as claimed in claim 2, wherein the thermoset resin is a polyester resin, a polyurethane resin, a phenol-formaldehyde resin or a urea-formaldehyde resin.

6. The conductive material as claimed in claim 1, wherein the conductive compound is in the form of particles.

7. The conductive material as claimed in claim 6, wherein the particles of conductive compound have a size from 5 nm to 5 μm.

8. The conductive material as claimed in claim 1, wherein the conductive compound comprises carbon black.

9. The conductive material as claimed in claim 1, wherein the conductive compound comprises transition metal particles.

10. The conductive material as claimed in claim 1, wherein the conductive material comprises from 0.1 to 15% by mass of conductive compound.

11. The conductive material as claimed in claim 1, wherein the conductive material has an electrical conductivity of from $10^{-8}$ to $10^2$ S/cm.

12. The conductive material as claimed in claim 1, further comprising a reinforcement.

13. The conductive material as claimed in claim 12, wherein the reinforcement comprises a weave of fibers.

14. The conductive material as claimed in claim 13, wherein the fibers are selected from the group consisting of carbon fibers, glass fibers, aramid fibers, and combinations thereof.

* * * * *